United States Patent
Buchner et al.

(10) Patent No.: US 6,943,818 B2
(45) Date of Patent: Sep. 13, 2005

(54) AUDIO-VISUAL INTERACTIVE SYSTEM COMPRISING SEVERAL FILMING DEVICES

(75) Inventors: Georges Buchner, Paris (FR); Alain Leyreloup, Issy les Moulineaux (FR); Patrick Desrousseaux, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/450,990

(22) PCT Filed: Dec. 21, 2001

(86) PCT No.: PCT/FR01/04173

§ 371 (c)(1),
(2), (4) Date: Dec. 18, 2003

(87) PCT Pub. No.: WO02/052851

PCT Pub. Date: Jul. 4, 2002

(65) Prior Publication Data

US 2004/0095460 A1 May 20, 2004

(30) Foreign Application Priority Data

Dec. 22, 2000 (FR) .......................... 00 16998

(51) Int. Cl.[7] .............................. H04M 7/14
(52) U.S. Cl. ................................. 348/14.01
(58) Field of Search .................. 348/14.01–14.16, 348/36, 211.12

(56) References Cited

U.S. PATENT DOCUMENTS

| 4,890,314 | A | | 12/1989 | Judd et al. |
| 5,187,571 | A | | 2/1993 | Braun et al. |
| 5,317,405 | A | * | 5/1994 | Kuriki et al. ............ 348/14.16 |
| 5,532,737 | A | * | 7/1996 | Braun ......................... 348/36 |
| 5,612,734 | A | | 3/1997 | Nelson et al. |
| 6,275,251 | B1 | * | 8/2001 | Hartman et al. ......... 348/14.01 |
| 6,532,035 | B1 | * | 3/2003 | Saari et al. .............. 348/14.02 |

FOREIGN PATENT DOCUMENTS

| EP | 0720412 A2 | 3/1996 |
| WO | WO98/47291 | 10/1998 |

OTHER PUBLICATIONS

PCT Rapport D'Examen Preliminaire International.

* cited by examiner

Primary Examiner—Wing Chan
(74) Attorney, Agent, or Firm—Fish & Richardson P.C.

(57) ABSTRACT

The invention concerns an audio-visual system interactive between a local scene and a remote scene. It comprises: a system for filming the local scene including several shooting devices (1) each provided with a field of view (α), means for arranging (13) said shooting devices so that the field of view of one shooting device should be adjacent to the next shooting device field of view and means for simultaneously controlling (14) the shots, and a system for restoring the image of the remote scene comprising at least a restoring device itself including a display screen whereon the image of the remote scene is formed.

10 Claims, 8 Drawing Sheets

Zone with 2 overlaps
Zone with 3 overlaps

LEGEND
☐ Shaded portion represents reflective surface of mirror

AUDIO-VISUAL INTERACTIVE SYSTEM COMPRISING SEVERAL FILMING DEVICES

The invention relates to an interactive audiovisual system comprising several pictures taking devices.

The invention also relates to a picture taking system.

The domain of the invention is telepresence, to bring a local scene and a remote scene together.

A videoconference is a means allowing one or several persons in local and remote scenes to hold a remote meeting.

Telepresence is an extension of a videoconference.

Telepresence, like a videoconference, is obtained through image transmission, sound transmission and possibly also transmission of data representing text, graphics, slide shows, etc.

Although a scene can take place outdoors, it usually takes place inside a building. This is why the location in which the local scene takes place will be called the local room and the location at which the remote scene takes place will be called the remote room.

Figure 1:
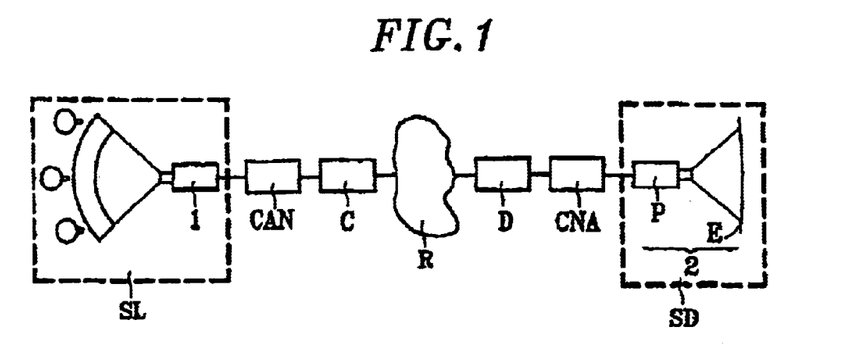

Transmission of an image from a local room SL in which there is a picture taking device 1 to a remote room SD in which there is a reproduction device is based on a scheme diagrammatically shown in FIG. 1 comprising a picture taking device 1 like a movie camera, possibly a digital analogue converter CAN, an encoding system C, a transmission network R, a decoding system D, possibly a digital analogue converter CAN and a device for reproducing the image 2 such as a projector P coupled to a screen E. This screen may be a plasma screen, or an LCD or a CRT screen, etc.

To achieve reciprocal communication, the system shown in FIG. 1 is reproduced in the opposite direction from the remote room SD in which the picture is taken to the local room SL in which the reproduction takes place.

Finally, each room is equipped with a picture taking device and a reproduction device.

Throughout the rest of this presentation, an interactive audiovisual system will refer to a system located in a room and comprising at least one picture taking device and one reproduction device.

Known interactive audiovisual systems include videoconference systems. These videoconference systems are in different forms including a videoconference room, a videophone, a multimedia communication personal computer (PC), an interactive terminal, etc.

These systems are made for use at a certain distance, both for taking the picture and for reproduction, depending on the size of the image and the use made of it.

The size of participants or objects during the reproduction varies as a function of the part of the field in which they are located and as a function of the angle of view α of the movie camera defining the maximum cone of the beam F of rays that can be captured among all the rays output from the scene to be recorded. Most existing cameras are conical picture taking devices.

To simplify matters, in the following we will consider these angles of view in two-dimensional space, actually the space as shown in the figures.

Figure 2A:
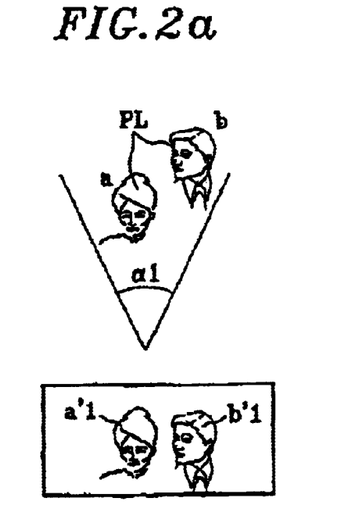
Figure 2B:
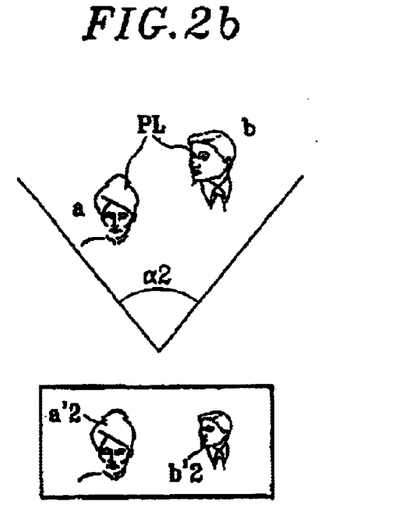

If it is required to film a wide scene, the first step is to widen the field but the reproduced images have the impression of being curved, to the extent that perspective effects are distorted on the edges of the image; the reproduced images display a variable magnification effect illustrated by FIGS. 2a) and 2b), well known to photographers who use a wide angle objective.

Each of these figures shows two local participants PL, a and b, one further back from the other, and filmed by a picture taking device presenting an angle of view α1 in the case in FIG. 2a) wider than the angle of view α2 in FIG. 2b).

The reproduced images a'1 and a'2 of a are practically similar in both cases, but the magnification of b'1 compared with b (FIG. 2a) is greater than the magnification of b'2 compared with b (FIG. 2b).

Figure 3A:
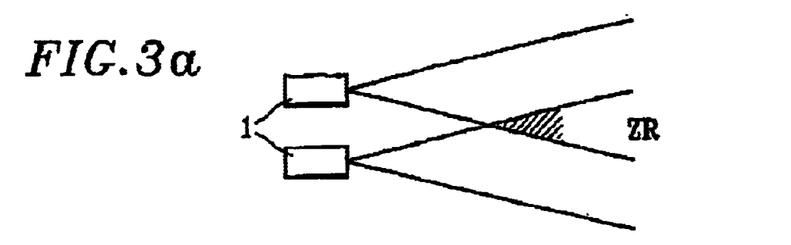
Figure 3B:
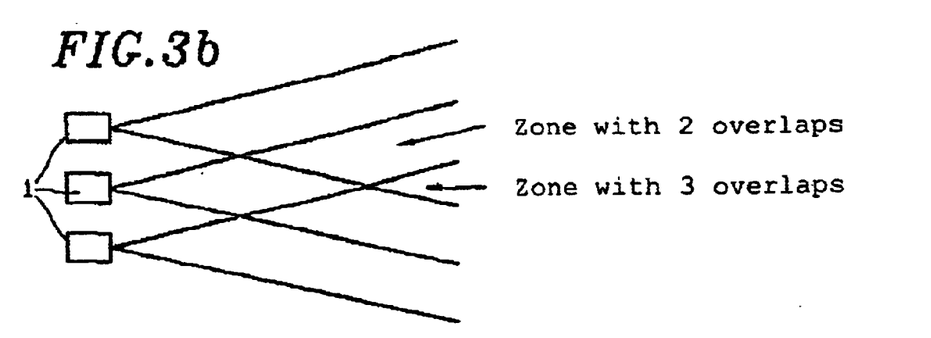

Several picture taking devices 1 are available to overcome these disadvantages related to a wide picture taking angle, each with an angle of view smaller than α2, as shown in FIGS. 3a) and 3b).

In order to achieve continuity of the pictures, these devices for which the optical axes are parallel and in the same plane are adjacent: several devices 1 are "concatenated". But it follows that the picture taking fields have common or overlapping areas ZR and that the images restored on one or several adjacent reproduction devices each correspond to a picture taking device, and will have discontinuities originating from duplicated parts or overlaps. The term overlap means multiple reproduction of the same scene taken by different cameras and with fields that partially overlap.

In the case of two picture taking devices 1 shown in FIG. 3a), there will be a zone with two overlaps ZR; in the case of three picture taking devices 1 shown in FIG. 3b), there will be some zones with two overlaps close to the picture taking devices, and some zones with three overlaps when further away from these devices, etc.

This view overlap phenomenon becomes worse when the angle of view of the picture taking devices increases.

Image processing software is now being developed to solve this problem, but the results achieved are not yet satisfactory.

Figure 4A:
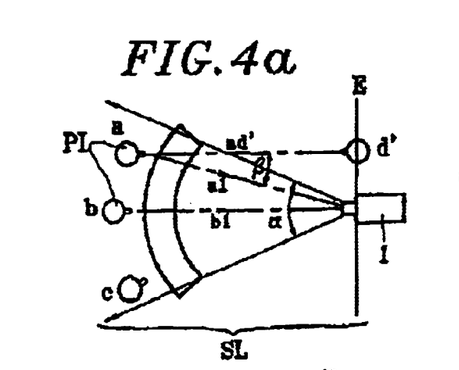
Figure 4B:
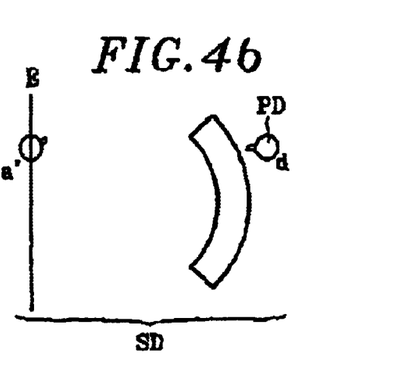

Another effect of conical picture taking devices is the "false token effect" illustrated in FIGS. 4a) and 4b) in a videoconference context between local participants and remote participants.

FIG. 4a) diagrammatically shows a top view of a conical picture taking device 1 of a local participant located in a local room SL. The direction of view of the participant is indicated by the small line intended to represent the participant's nose. The image of the remote participants PD present in the remote room SD (FIG. 4b), and particularly the image of the remote participant d, are shown on a screen E.

When the local participant a who is not on the centreline of the camera shown by the ray b1, speaks to the remote participant, he looks at the image d' of this remote participant on the screen E. Although a is looking directly at d' along the ray ad', the camera receives the ray a1, and finally films the profile of the participant a.

This profile image is transmitted to the reproduction device located in the remote room SD, and the reproduction device reproduces the image a' of a at d, as illustrated in FIG. 4b), as if a were not looking at d. Eye contact is not reproduced.

One solution for reducing the annoying effect caused by taking pictures with a wide angle (false token effect and distorted perspective), consists of limiting the angle β formed at a point a on the scene by the rays ad' and a1, shown in FIG. 4a). A specification issued by the ETSI (European Telecommunications Standards Institute), recommends that this angle β should not exceed 8°. This angle is obtained by limiting or truncating the filmed scene, or by placing the camera close to the display axis, which hinders the display.

Therefore, the purpose of this invention is to eliminate the problem of overlapping views in the case of a multiple picture taking system, by achieving continuity of different views and possibly eliminating the problem related to the "false token effect".

It is a means of increasing the comfort between remote participants by giving them the impression of sharing the same space and facilitating informal meetings.

The purpose of the invention is an interactive audiovisual system between a local scene and a remote scene, characterized mainly in that it comprises:

A system for taking pictures of the local scene including several picture taking devices each with an angle of view, means of arranging the said picture taking devices such that the angle of view of a picture taking device is contiguous with the angle of view of the picture taking device adjacent to it, and means for simultaneously controlling views, and a system for reproducing the image of the remote scene comprising at least one reproduction device itself comprising a screen on which the image of the remote scene is formed.

The reproduction device may also include a semi-reflecting strip located between the local scene and the screen, capable of reflecting the beam output from the local scene to the picture taking device.

According to one characteristic of the invention, the angle of view defining a beam of light rays that can be captured by a picture taking device, at least one of the said picture taking devices is associated with a mirror that will reflect the beam towards the said picture taking device.

Advantageously, the picture taking device comprises several adjacent mirrors arranged in a booth.

According to another characteristic of the invention, the picture taking device and the associated mirror form an assembly with coincident centre lines; the interactive audio-visual system may include several adjacent and aligned mirrors and possibly several reproduction devices, for which the screens are adjacent and aligned.

Another purpose of the invention is the picture taking system alone.

Other special features and advantages of the invention will become clear after reading the description given as a non-limitative example and in relation to the attached drawings in which:

FIG. 1, already described, diagrammatically shows the system of elements located along the path of an image between a local room and a remote room, FIGS. 2a) and 2b), already described, illustrate the magnification effect of the reproduced image as a function of the angle of view of the picture taking device, FIGS. 3a) and 3b), already described, demonstrate overlap areas in the case of two and three picture taking devices respectively, FIGS. 4a), 4b) and 4c), already described, illustrate the false token effect, FIGS. 5a) and 5b) diagrammatically represent an embodiment of a picture taking system according to the invention, FIGS. 6a) and 6b) diagrammatically show another embodiment of a picture taking system according to the invention, FIG. 6c) shows a perspective view of one example of cylindrical or annular mirrors disposed adjacent and aligned with each other.

Figure 5A:
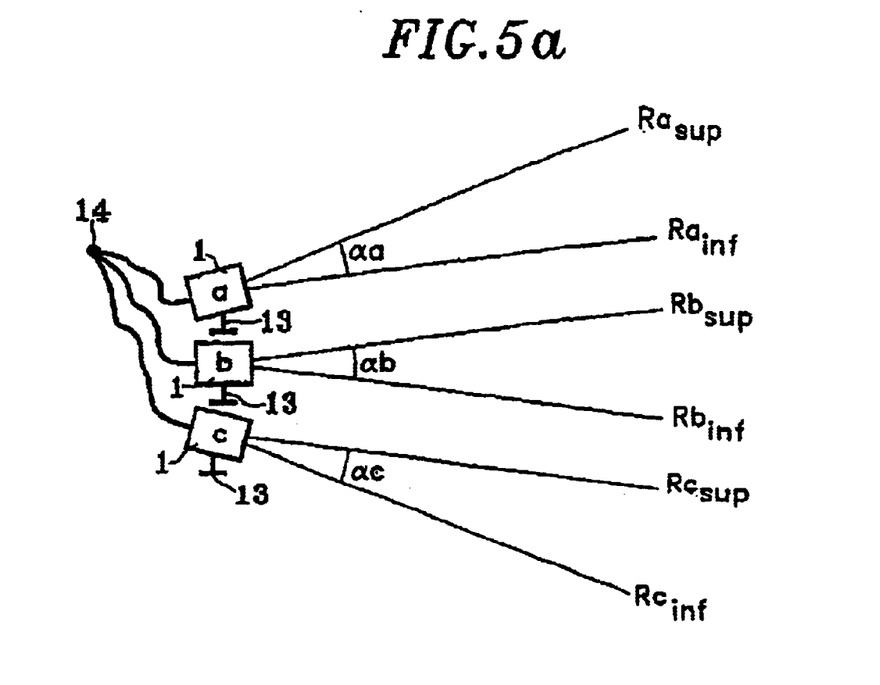

FIGS. 5a), 5b), 6a) and 6b) relate to a picture taking system comprising several picture taking devices 1, in fact three devices 1a, 1b and 1c. The views or the scenes to be recorded are in planes perpendicular to the plane of the figures and are recorded simultaneously by devices 1a, 1b and 1c, using a control 14 that simultaneously triggers pictures taken by each of the devices.

Each picture taking device 1 is characterized by its angle of view $\alpha$.

According to the invention, the picture taking devices 1 are arranged such that their angles of view are contiguous two by two. To achieve this, the picture taking system comprises means 13 of arranging the picture taking devices 1; for example, they are installed on an articulated stand like those used by photographers, to displace and/or orient the picture taking device in different directions and to fix it in the required position and/or orientation. An articulated stand can be used for each different picture taking device, or several picture taking devices can be installed on the same articulated stand.

The lower edges of the angles of view of the devices 1a, 1b and 1c are denoted by rays $Ra_{inf}$, $Rb_{inf}$ and $Rc_{inf}$ respectively; and the upper edges of the angles of view are denoted $Ra_{sup}$, $Rb_{sup}$, $Rc_{sup}$, respectively.

Thus in FIG. 5a), the devices 1a, 1b and 1c are oriented such that $Ra_{inf}$ is parallel to $Rb_{sup}$ and $Rb_{inf}$ is parallel to $Rc_{sup}$: but their position introduces a difference between the angles of view and consequently, for example, a discontinuity between the pictures taken by device 1a and the pictures taken by device 1b.

Figure 5B:
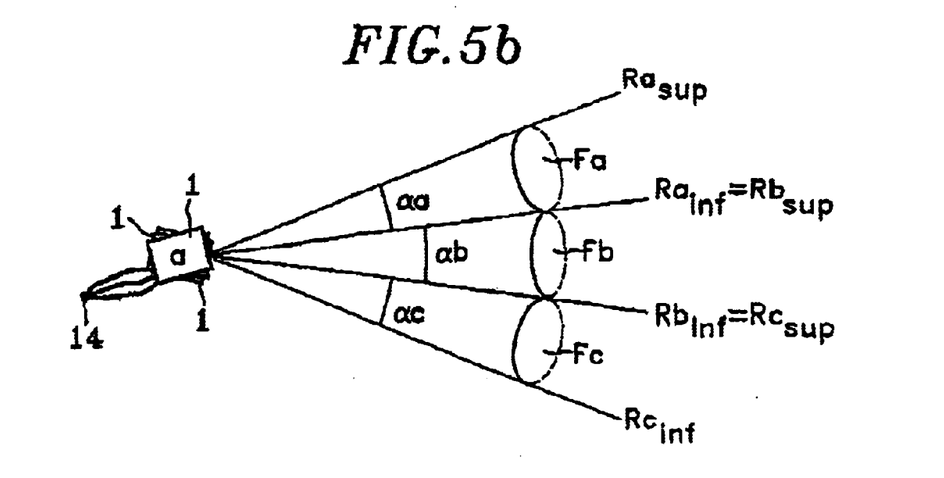

This disadvantage is overcome by superposing devices 1a, 1b and 1c as shown in FIG. 5b). The result is then $Ra_{inf}=Rb_{sup}$ and $Rb_{inf}=Rc_{sup}$. Thus, there is continuity between the views taken by device 1a and the views taken by device 1b; similarly, there is continuity between the views taken by device 1b and the views taken by device 1c.

It is still not possible to superpose devices 1a, 1b and 1c as shown in FIG. 5b). Furthermore, it is sometimes desirable to reduce the distance between the scene to be recorded and the picture taking devices. One solution is then to use one or several mirrors to reflect the beams F corresponding to each of the angles of view $\alpha$. The beams corresponding to the angles of view $\alpha a$, $\alpha b$ and $\alpha c$ are denoted Fa, Fb and Fc respectively.

The rays $Ra_{inf}$ and $Rb_{sup}$ that are reflected by these mirrors are then only parallel over part of their length; similarly for rays $Rb_{inf}$ and $Rc_{sup}$. In the future, the concept of two by two contiguous angles of view will encompass the concept of partial contiguity.

Figure 6A:
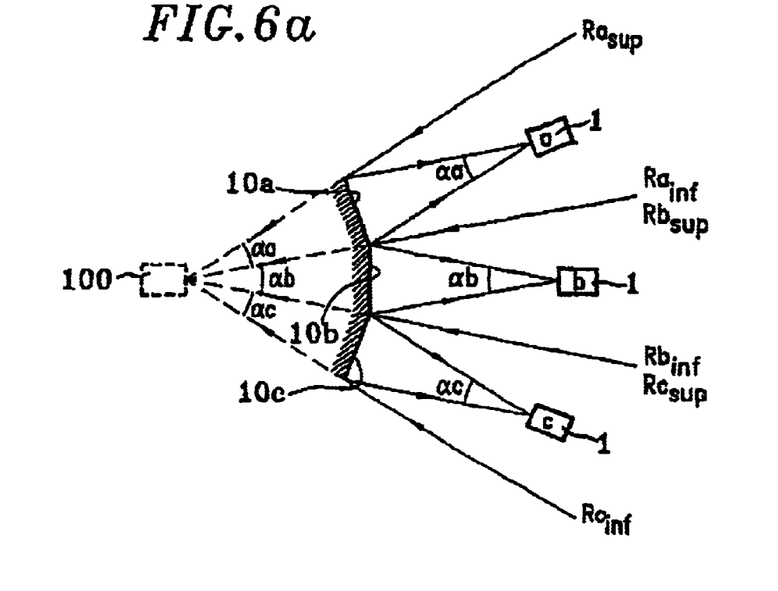
Figure 6B:
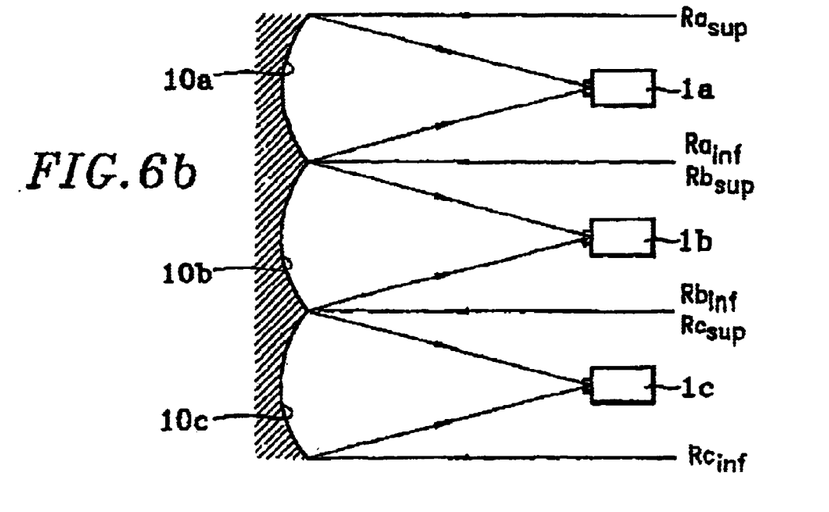

Two picture taking systems corresponding to this solution are shown in FIGS. 6a) and 6b): adjacent mirrors 10a, 10b and 10c are placed on the trajectory of the beams Fa, Fb and Fc respectively. Preferably, the angles of view $\alpha a$, $\alpha b$ and $\alpha c$ are equal.

In the case shown in FIG. 6a, the mirrors are arranged in a booth, in other words around a portion of a polygon. As the angle of view becomes more open, the sides of the polygon become longer and the picture taking devices 1a, 1b and 1c become more remote from each other. This type of configuration corresponds to that shown in FIG. b): everything takes place as if the picture taking devices 1a, 1b and 1c were superposed at location 100.

The mirrors may be plane.

Figure 4C:
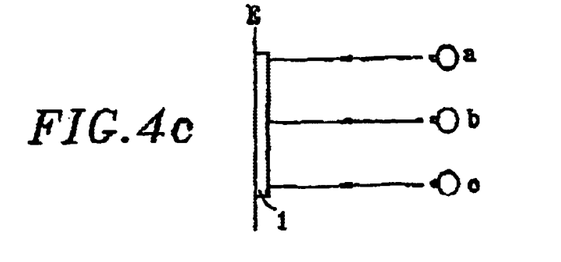
Figure 6C:
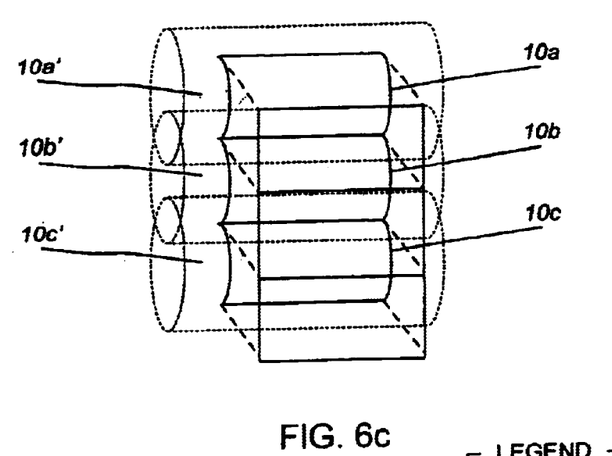
Figure 6D:
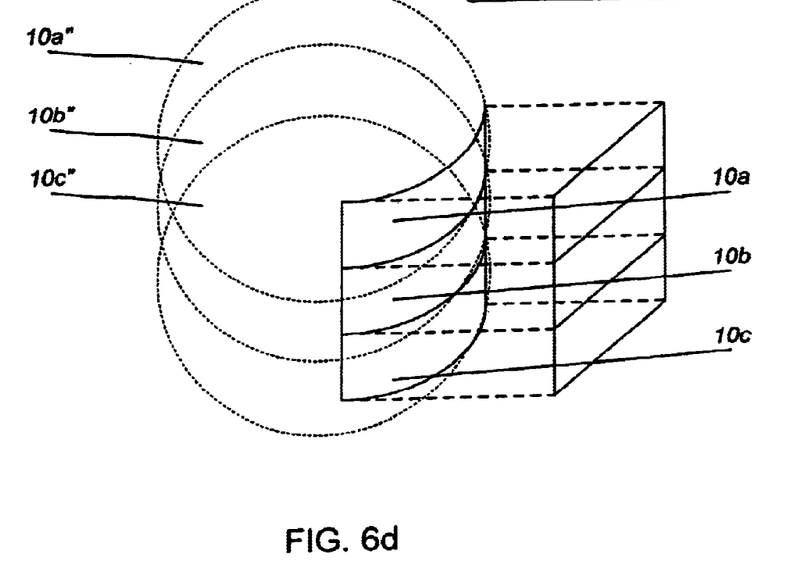
FIG. 6d) shows a perspective view of one example of mirrors of revolution disposed adjacent and aligned with each other.

In the case shown in FIG. 6b), the picture taking system has coincident centre lines: the mirrors 10a, 10b and 10c are concave and each has a focal point so as to reflect beams Fa, Fb and Fc composed of rays parallel to each other onto the devices 1a, 1b and 1c located at the focal points of the mirrors, the beams then being cylindrical. The field of view is then no longer conical, and becomes cylindrical as shown in FIG. 4c) for a single picture taking device. This type of system with coincident centre lines is a means of allowing each picture taking device to record rays parallel to ray ad' in FIG. 4a) and thus has the advantage that it eliminates the false token effect. In one example, the mirrors 10a, 10b and 10c are cylindrical or annular mirrors that are disposed adjacent and aligned with each other as shown in FIG. 6c. Each cylindrical or annular mirror 10a, 10b, and 10c is formed by causing a partial section of a respective cylinder 10a', 10b', and 10c' to have a reflective surface. In another example, the mirrors 10a, 10b, and 10c are mirrors of revolution that are disposed adjacent and aligned with each other as shown in FIG. 6d. In the illustrated example of FIG. 6d, each mirror of revolution 10a, 10b, 10c is formed by rotating a two-dimensional curve about an axis to generate a spheroid surface of revolution 10a", 10b", and 10c", and causing a partial section of the respective spheroid 10a", 10b", and 10c" to have a reflective surface. Other mirrors of revolution may be similarly formed by rotating any two-dimensional curve about an axis to form a surface of revolution and providing a partial section of the surface of revolution with a reflective surface.

Picture taking systems like those described are applicable to different domains such as photography, cinematography, videoconference, remote medicine, remote teaching or more generally telepresence. They can also be installed in games areas.

We will now more specifically consider the domain of telepresence and will describe an interactive audiovisual system including firstly a picture taking device of a local scene like one of those that have just been described and secondly a system for reproduction of a remote scene.

Figure 7A:
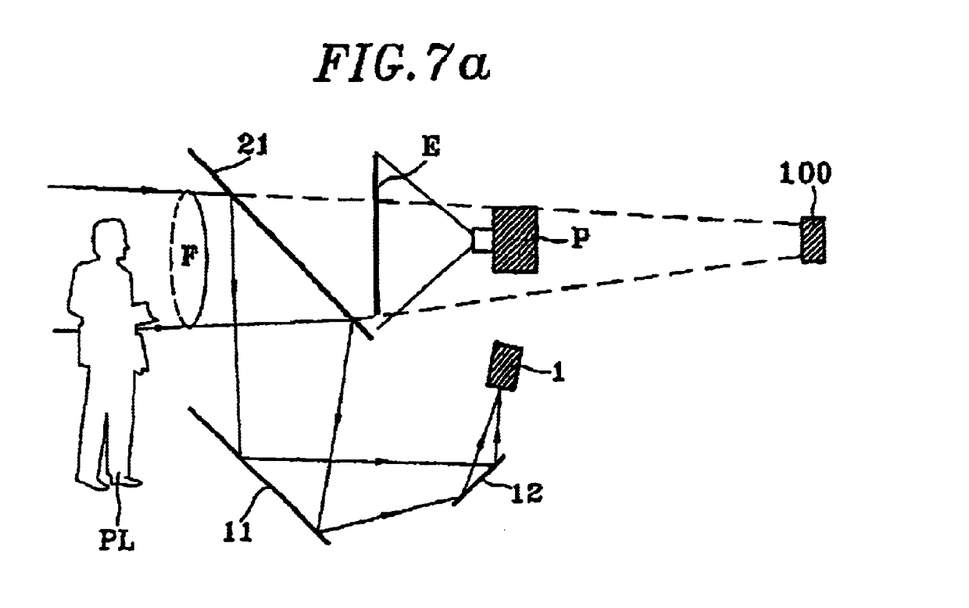
FIGS. 7a) and 7b) diagrammatically represent an interactive audiovisual system comprising a picture taking system and a reproduction system, FIGS. 8a) and 8b) represent an embodiment of an interactive audiovisual system according to the invention arranged in a booth, FIG. 9 diagrammatically shows an example of the operation of an interactive audiovisual system according to the invention.

Firstly, FIG. 7a) shows an interactive audiovisual system comprising a picture taking device and a reproduction device.

The reproduction device 2 comprises a video projector P projecting the image of the remote scene on a screen E facing the local participant PL. The screen E may be a plasma screen, or an LCD or a CRT screen, etc. The image may be in any format (16/9, 4/3, 3/4) to cinema, photo standards, etc. The local participant PL observes the image of the remote scene formed on the screen E, through a semi-reflecting strip 21 used in this case for its transmission capacity. A semi-reflecting, also called a semi-transparent strip, is characterized by reflection and transmission coefficients, for example equal to 30% and 70% respectively.

The picture taking device 1, for example a camera, is associated with two plane mirrors 11 and 12 and the semi-reflecting strip 21 to reflect the beam F. In this case, the semi-reflecting strip is used for its reflection capacity and it may thus act as the mirror 10 in FIGS. 6a) and 6b) (the mirror 10 and the semi-reflecting strip 21 are coincident).

The camera 100 is the virtual camera corresponding to the unreflected beam.

A picture taking system that enables the telepresence effect (reduction of the false token effect, non overlap of views, panoramic effect) may be coupled to a reproduction system that has a close-up booth effect so that the images projected on a flat screen are placed adjacent as well as possible (the booth is very open) The screen may also be curved.

Figure 7B:
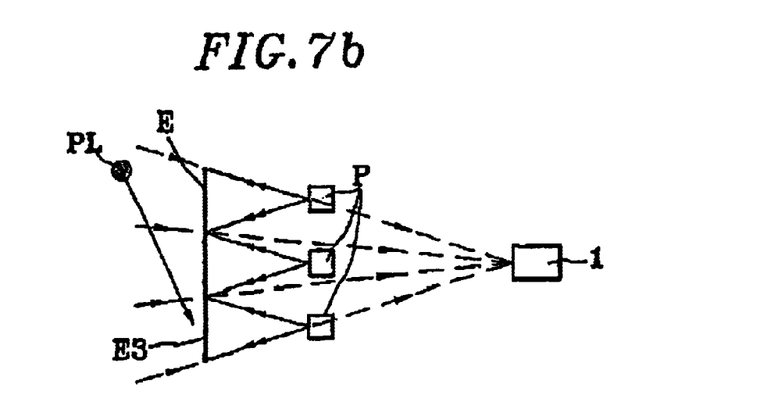

FIG. 7b) contains an example of such an interactive audiovisual system. Three light beams converge towards the picture taking device 1, and are superposed on three beams output from three video projectors P, forming three contiguous images on a single flat screen F, and not on three screens arranged in a booth.

This configuration facilitates manufacturing of the screen and the skew view of the local participant PL towards part E3 of the screen; but it slightly reduces eye contact when the participant PL is at the edge of the system.

Figure 8A:
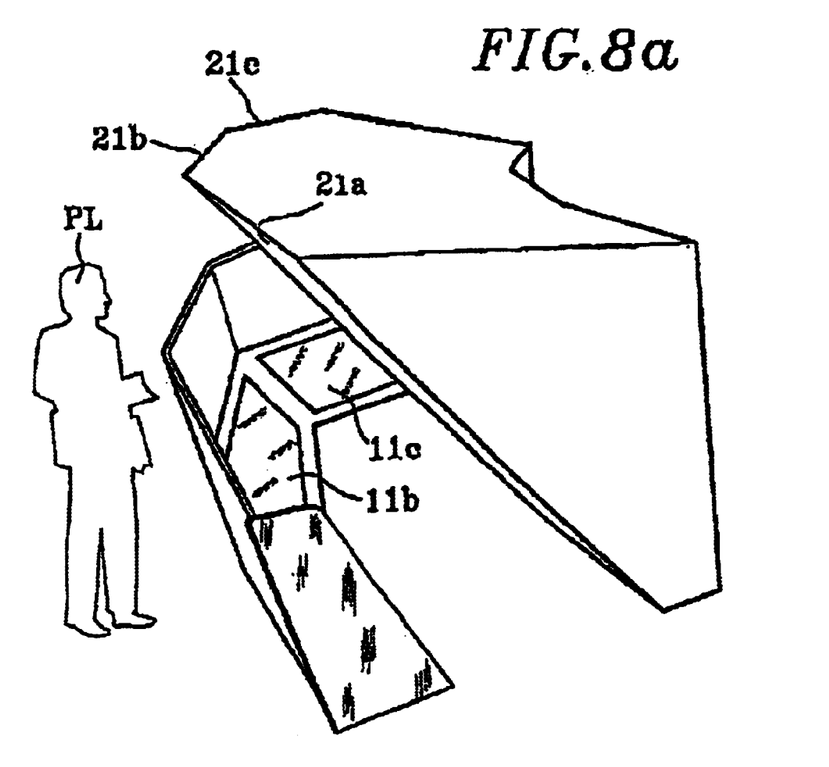

FIGS. 8a) and 8b) diagrammatically show a perspective view of a prototype of an audiovisual interactive system according to the invention comprising several systems similar to the system shown in FIG. 7 and arranged in a booth.

Figure 8B:
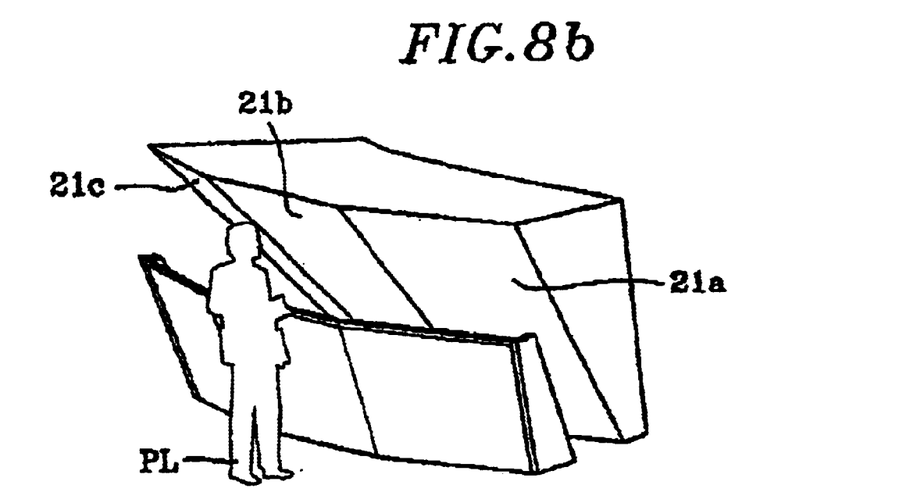

This system comprises several semi-reflecting strips 21a, 21b, 21c and several mirrors 11a, 11b and 11c. A local participant PL is diagrammatically shown in front of the system.

This type of interactive audiovisual system according to the invention may be used in contexts other than a videoconference.

Figure 9:
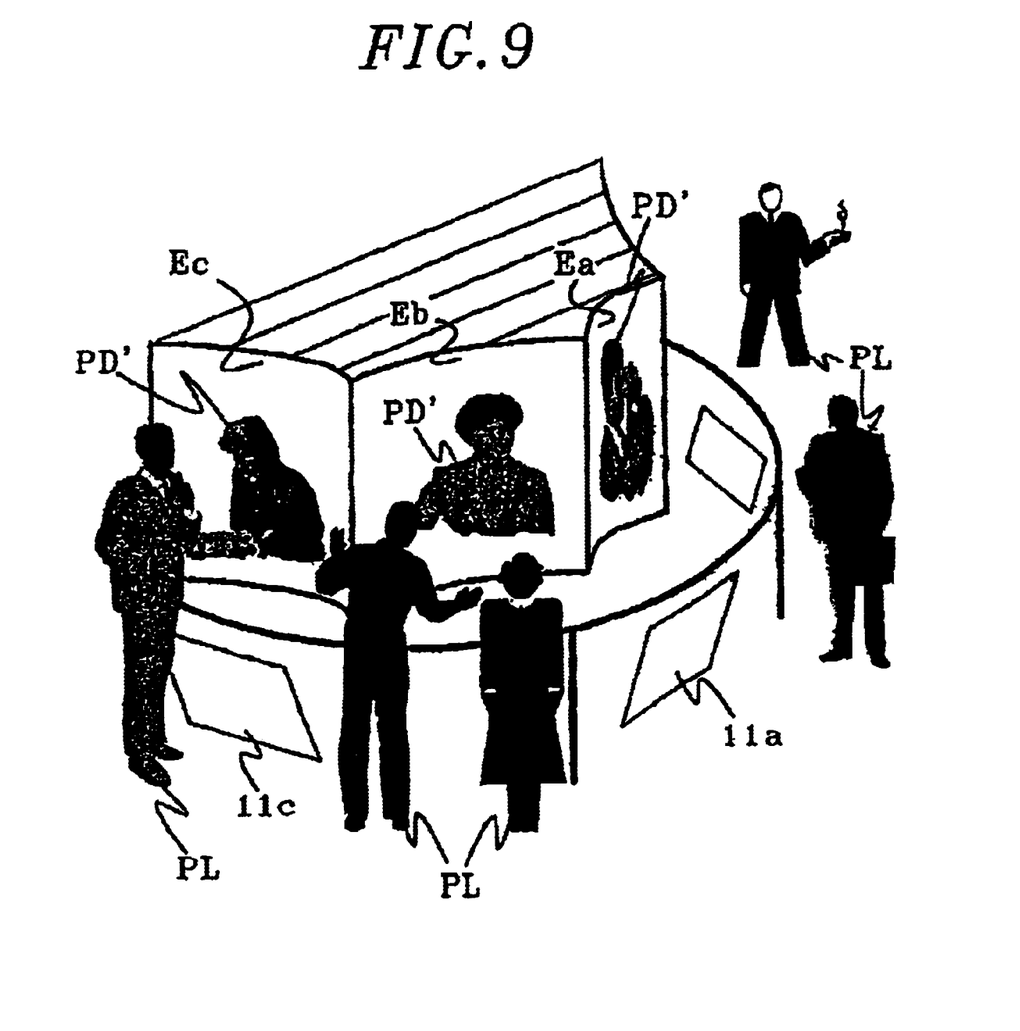

One example operation of an interactive audiovisual system according to the invention is shown diagrammatically in FIG. 9. This is a system in which the picture taking and reproduction devices are arranged in a booth. This figure shows the mirrors 11a, 11b (hidden) and 11c of the picture taking devices. The images PD' of the remote participants are formed on curved screens Ea, Eb and Ec. The local participants PL can circulate around the booth and move from one picture taking device to the other without any discontinuity between views.

According to another configuration, the system may be in the form of a telepresence wall in a hall, in the street, etc. A person passing in front of a telepresence wall, for example in Paris, can communicate privately and informally with a person walking in front of another telepresence wall in another location, for example located in Nantes and connected to the telepresence wall in Paris, in the same way as if they had met in a street, or in a corridor, etc. For example, these persons in different locations can walk "side by side".

These systems are connected almost permanently to another booth or a telepresence wall in another location. It is no longer necessary to reserve the service as is often the case at the moment for videoconference systems.

A few examples of interactive audiovisual systems according to the invention have been presented, but it is obvious that the invention is applicable to other configurations.

What is claimed is:

1. An interactive audiovisual system comprising:
   a first system for taking pictures of a local scene including a plurality of picture taking devices, each picture taking device with an angle of view defining a beam of light rays from the local scene that can be captured by the picture taking device, wherein at least a first picture taking device is associated with a first mirror designed to reflect a beam to the first picture taking device, the first picture taking device and the associated first mirror forming an assembly with coincident centre lines,
   means for arranging the plurality of picture taking devices such that the angle of view of the first picture taking device is contiguous with the angle of view of a second, adjacent picture taking device, and means for simultaneously controlling views, and
   a second system for reproducing the image of a remote scene comprising at least one reproduction device, the reproduction device comprising a screen on which the image of the remote scene is formed.

2. The interactive audiovisual system of claim 1, wherein the reproduction device further comprises a semi-reflecting strip for reflecting a beam from the local scene to at least one of the picture taking devices.

3. The interactive audiovisual system of claim 1, wherein the first mirror is concave and has a focal point, and the first picture taking device is located close to the focal point of the first mirror.

4. The interactive audiovisual system of claim 3, wherein the first mirror is a cylindrical or annular mirror, or a mirror of revolution.

5. The interactive audiovisual system of claim 1, wherein the first mirror is one of a plurality of mirrors in the first system, the plurality of mirrors being adjacent and aligned with each other.

6. The interactive audiovisual system of claim 1, wherein the reproduction device is one of a plurality of reproduction devices in the second system, each reproduction device having a screen, the screens of the plurality of reproduction devices being adjacent and aligned with each other.

7. A picture taking system comprising:

a plurality of picture taking devices, each picture taking device having an angle of view defining a beam of light rays that can be captured by the picture taking device, means for arranging the angle of view of a first picture taking device so that it is contiguous with the angle of view of a second, adjacent picture taking device, and means for simultaneously controlling views, and wherein at least a first picture taking device is associated with a mirror capable of reflecting a beam of light rays towards the first picture taking device, the first picture taking device and the associated mirror forming an assembly with coincident centre lines.

8. The picture taking system of claim 7, wherein the mirror is concave and has a focal point, and the first picture taking device is located close to the focal point of the mirror.

9. The picture taking system of claim 8, wherein the mirror is a cylindrical or annular mirror, or a mirror of revolution.

10. The picture taking system of claim 7, wherein the mirror is one of a plurality of mirrors, the mirrors being adjacent and aligned with each other.

* * * * *